United States Patent [19]

Lee

[11] Patent Number: 5,251,780
[45] Date of Patent: Oct. 12, 1993

[54] REFUSE CONTAINER HAVING REMOVABLE WEAR-RESISTANT PADS

[75] Inventor: Norman C. Lee, Greensboro, N.C.
[73] Assignee: Zarn, Inc., Reidsville, N.C.
[21] Appl. No.: 980,760
[22] Filed: Nov. 24, 1992
[51] Int. Cl.⁵ .............................................. B65D 25/00
[52] U.S. Cl. .................... 220/630; 220/632; 220/908
[58] Field of Search ............... 220/630, 632, 908, 729, 220/732

[56] References Cited

U.S. PATENT DOCUMENTS

| | | | |
|---|---|---|---|
| 1,864,200 | 6/1932 | Kaufmann | 220/632 |
| 3,534,882 | 10/1970 | Botsford | 220/632 X |
| 3,963,226 | 6/1976 | Jankowski, Jr. | 220/632 X |
| 4,141,459 | 2/1979 | Eli, Jr. | 220/630 X |
| 4,351,539 | 9/1982 | Rodolakis | 220/908 X |
| 4,953,744 | 9/1990 | Koyama | 220/908 X |

*Primary Examiner*—Steven M. Pollard
*Attorney, Agent, or Firm*—Shefte, Pinckney & Sawyer

[57] ABSTRACT

An apparatus is disclosed for collection of refuse comprising a container body defining an interior receiving area and having a first end defining an access opening into the interior receiving area. A second end of the container body is closed and has a region which is exposed to excessive wear during use. The container also has at least one wear resistent element removably and replaceably attached to the container body over at least a portion of the wear region to form a primary wear surface, thereby protecting the wear region and extending the useful life of the apparatus. The wear resistent element may be formed of plastic and may be a glass filled nylon plastic. The second end of the container body may have a corner with the wear region comprising the corner. The wear resistent element may be attached to the container body adjacent the corner. The second end of the container body may have two corners at opposite sides of the container body and the each of the wear resistent elements may be attached to each corner. The container body may be formed with at least one aperture adjacent the wear region and the wear resistent element may include at least one complementary protrusion for engagement within the one aperture to secure the wear resistent element to the container body.

3 Claims, 2 Drawing Sheets

REFUSE CONTAINER HAVING REMOVABLE WEAR-RESISTANT PADS

BACKGROUND OF THE INVENTION

The present invention relates generally to refuse containers and, more particularly, to a refuse container adapted to extend the operational lifetime of the containers.

Refuse containers, especially, for example, those employed in municipal trash collection programs, are quite often subjected to heavy use and even abuse. Consequently, such containers are typically made of sturdy wear resistent materials such as metal or heavy duty plastic. However, even these heavy duty materials can over time wear under the constant use to which the containers are subjected. Often, such wear occurs when the container is dragged along the ground from one point to another as opposed to the intended mode of movement by lifting and carrying or rolling if the container is of the type having wheels. This type of constant abuse, typically wears down the lower edge, perimeter or corners of the container. Once the lower edge, perimeter or corner is worn to the point of creating a hole in the container, the refuse container's strength and ability to perform its function is significantly impaired even though the body of the container may otherwise be in excellent condition.

Some container manufacturers have attempted to overcome this problem by molding or fabricating containers which are thicker at the regions subject to excessive use. While this fabrication method increases a container's useful life, eventually, the thicker areas will wear and a new container required.

Thus, a refuse container which is wear resistant to the use described above is desired.

SUMMARY OF THE INVENTION

This and other objects of the present invention are provided with an apparatus for collection of refuse comprising a container body defining an interior receiving area and having a first end defining an access opening into the interior receiving area. A second end of the container body is closed and has a region which is exposed to excessive wear during use. The container also has at least one wear resistent element removably and replaceably attached to the container body over at least a portion of the wear region to form a primary wear surface, thereby protecting the wear region and extending the useful life of the apparatus. The wear resistent element may be formed of plastic and may be a glass filled nylon plastic. The second end of the container body may have a corner with the wear region comprising the corner. The wear resistent element may be attached to the container body adjacent the corner. The second end of the container body may have two corners at opposite sides of the container body and the each of the wear resistent elements may be attached to each corner. The container body may be formed with at least one aperture adjacent the wear region and the wear resistent element may include at least one complementary protrusion for engagement within the one aperture to secure the wear resistent element to the container body.

An apparatus for collection of refuse is also disclosed comprising a container body which defines an interior receiving area, a first end of the container body defining an access opening into the interior receiving area, and a second end of the container body being closed. Wheels are attached to one side of the container body adjacent the second end and the second end of the container body has a resting surface opposite the wheels. The resting surface has a region which is subject to excessive wear during use. At least one wear resistent element which is removably and replaceably attached to the container body is also included and positioned over at least a portion of the wear region to form a primary wear surface thereby protecting the wear region and extending the useful life of the apparatus. The wear resistent element may be formed of a glass filled nylon plastic. The resting surface of the second end of the container body has two corners at opposite sides of the container body. One of the wear resistent elements may be attached to each of the corners. The container body may be formed with at least one aperture adjacent the wear region and the wear resistent element may include at least one complementary protrusion for engagement within the aperture to secure the wear resistent element to the container body.

DESCRIPTION OF THE PREFERRED EMBODIMENT

Figure 1:
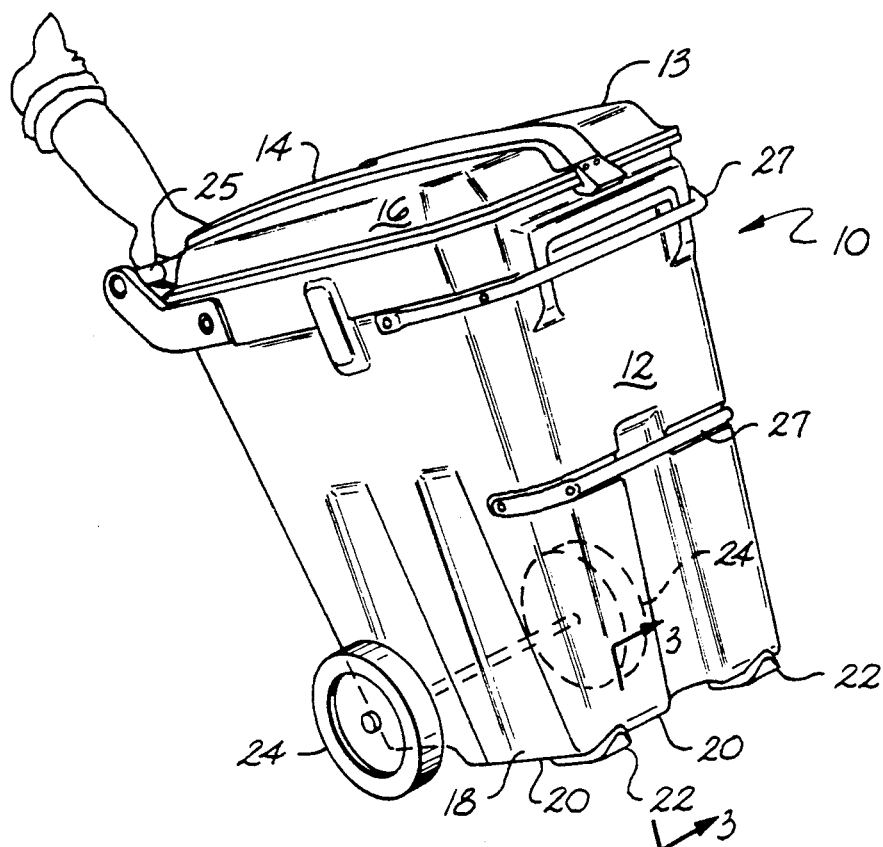
FIG. 1 is a perspective view of a refuse container of the present invention having wear resistant pads.

Referring now to FIG. 1, a refuse container according to the preferred embodiment of the present invention is shown generally at 10. The container 10 has a hollow container body 12 having a first upper end 14 defining an access opening 16 into an interior trash receiving area and a second lower end 18 which is closed to form a container bottom. A lid 13 is pivotably mounted to the upper end of the container body 12 to selectively open and close the access opening 16.

The container 10 is of the general type typically used in large scale municipal trash collection programs, which are expected to benefit most from the present invention. In the illustrated embodiments, the container body 12 is generally square or rectangular in shape, presenting four essentially distinct sides. As is common with large capacity containers such as are used in municipal trash collection systems, a pair of wheels 24 are mounted at one side of the container body 12 adjacent its juncture with the container bottom 18. The container bottom 18 forwardly of the wheels 24 is substantially flat and is formed at substantially the same level as the lower edge of the wheels to serve, in conjunction with the wheels, as a resting surface for upright disposition of the container 10 thereon. A handle 25 is affixed to the upper end of the container body 12 at the same side as, and directly above, the wheels 24 to facilitate rolling movement of the container 10 from one point to another. A set of lifter bars 27 are affixed to the container body 12 at the opposite side thereof from the handle 25 for automated dumping of the container using conventional apparatus commonly mounted on trash collection vehicles.

Figure 2:
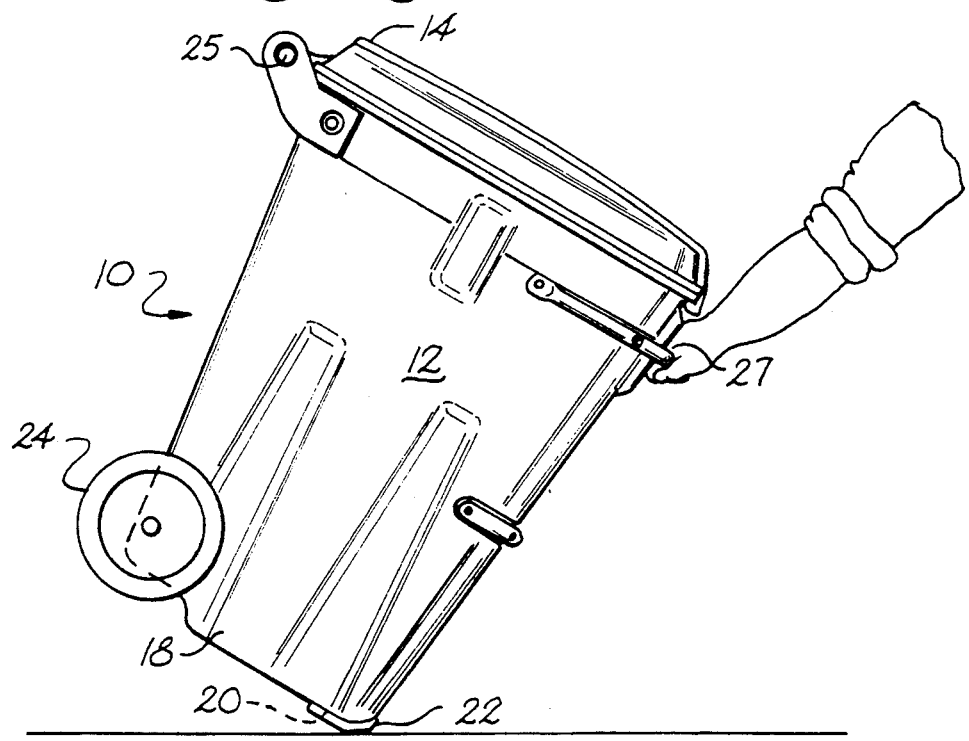
FIG. 2 is a side elevational view of the refuse container of the present invention having wear resistant pads.

Disadvantageously, trash collection personnel often do not both grasp the handle 25 and roll the container 10 on its wheels 24 but instead, as shown in FIG. 2, drag the container 10 by the lifter bars 27, causing the container body 12 to skid along the region at the juncture between the forward side and the bottom of the body 12, as indicated at 20 in FIGS. 1 and 2.

For this reason, one or more wear resistant pads 22 are removably and replaceably attached to the container body 12 at the lower edge region 20, preferably adjacent the corners formed at the opposite ends of the edge region. As seen in FIG. 2, the use of removable wear resistant skid pads 22 at the wear region 20 contacting the ground causes the pads 22 to receive and suffer the brunt of the wear produced by the aforementioned abuses and thereby protects the region from the wear which would eventually create a hole in the container, shortening its useful life. Thus, the container of the present invention expands the life of the product by providing for the periodic removal of worn pads 22 and the insertion of new pads as explained hereinafter with reference to FIGS. 3A and 3B and 4A and 4B.

Figure 3A:
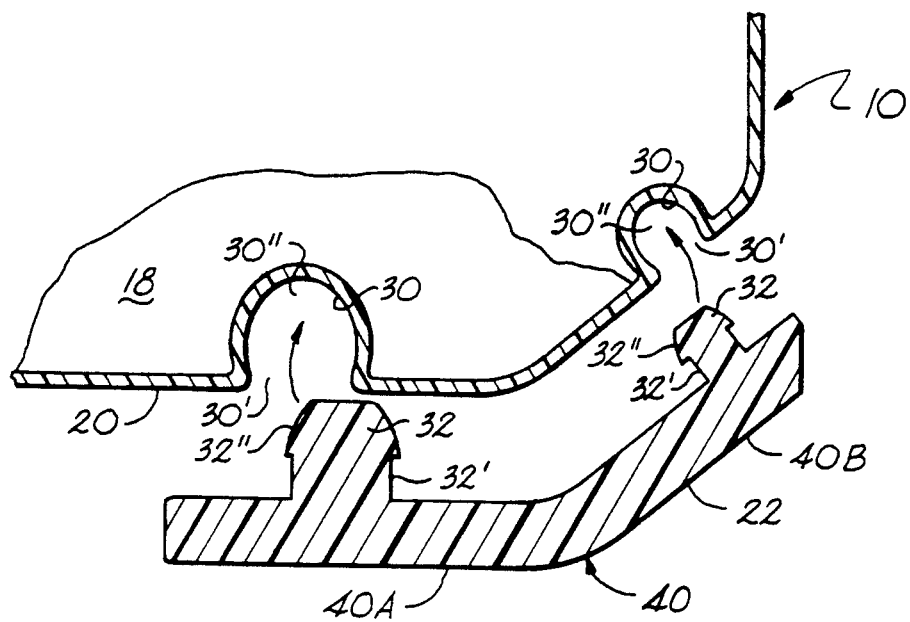
FIGS. 3A and 3B are vertical cross-sectional views of the refuse container of FIGS. 1 and 2, taken along line 3—3 thereof through one of the wear resistant pads, showing the pad in exploded and assembled dispositions, respectively.
Figure 3B:
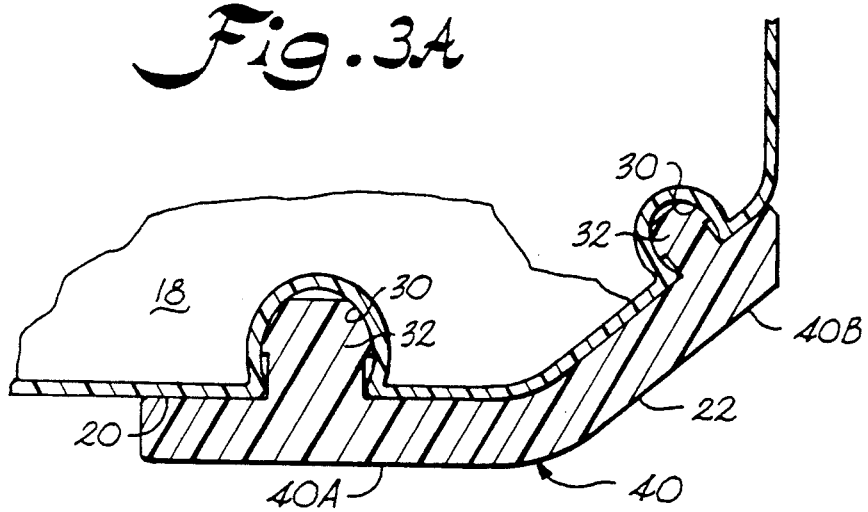

Referring now to FIG. 3A, a first preferred embodiment of the present invention is shown, wherein the lower end 18 of refuse container 10 contains a pair of pad-attachment recesses 30 at each skid pad mounting location along the wear region 20 and each skid pad 22 has a pair of corresponding protrusions 32 formed on its rear side. The recesses 30 and the protrusions 32 are compatibly configured so that the protrusions 32 snap into the recesses 30 to allow the wear resistant skid pad 22 to be held securely in place during the life of the pad as shown in FIG. 3B, and unsnapped and removed when the pad is worn. More specifically, each recess 30 has a constricted entrance opening 30' at the outer surface of the wear region 20 and an enlarged protrusion retaining area 30'' inwardly of the opening 30'. Each protrusion 32 has an enlarged outer head 32'' corresponding in size and shape to the retaining area 30'' and a constricted collar portion 32' corresponding in size and shape to the entrance opening 30'. Each pad 22 has an outwardly facing contact surface 40 preferably of a curved configuration to present a downwardly facing lower surface 40A and a laterally facing side surface 40B. Thus, the lower surface 40A contacts the ground when the container is in its upright resting position, as seen in FIG. 1, and the intermediate curved portion of the pad along with the side surface 40B primarily contact the ground when the container is being dragged in the manner shown in FIG. 2.

Figure 4:
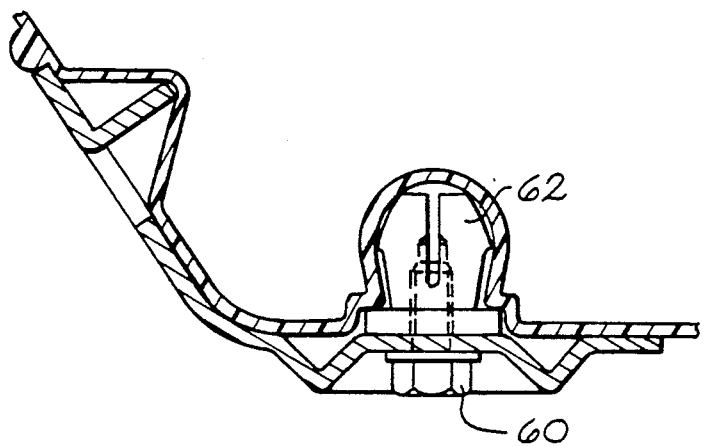
FIG. 4 is a vertical cross-sectional view similar to FIGS. 3A and 3B, showing a second embodiment of a wear resistant pad on a refuse container of the present invention.

While the pad 22 is preferably formed of plastic, a metal pad may also be employed as seen in FIG. 4. The pad may be secured to the wear region with a self-tapping screw 60 placed through an aperture in the pad and connecting an insert device 62 to the pad. The insert device 62 is formed so as the snap through the apertures in the container and keep the pads securely in place.

As seen in FIGS. 3A and 3B, the wear resistant pads preferably have an "L" shaped cross section. One leg 22A of the pad should cover a portion of the lower end 18 and the other leg 22B should cover a portion of the closed bottom end of the container 10. Additionally, the pads should preferably wrap around the lower corner of the container as seen best in FIG. 1. Preferably, the removable wear resistant pads 22 are formed of a glass-filled nylon plastic to an appropriate thickness to result in a long life for the pads.

It will therefore be readily understood by those persons skilled in the art that the present invention is susceptible of a broad utility and application. For example, the instant invention can be used with other types of containers with or without wheels. Thus, many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for collection of refuse comprising:
    a container body which defines an interior receiving area;
    a first end of said container body defining an access opening into said interior receiving area;
    a second end of said container body being closed;
    wheel means attached to one side of said container body adjacent said second end;
    said second end of said container body having a resting surface opposite said wheel means, said resting surface having two corners at opposite sides of said container body which are subject to excessive wear during use;
    a wear resistant element removably and replaceably attached to said container body adjacent each said corner to form a primary wear surface, thereby protecting said corners and extending the useful life of said apparatus; and
    said container body being formed with at least one aperture adjacent each said corner and each said wear resistant element includes at least one complementary protrusion for engagement within a respective said aperture to secure said wear resistant element to said container body.

2. An apparatus for collection of refuse according to claim 1 wherein said wear-resistant element is formed of a plastic.

3. An apparatus for collection of refuse according to claim 2 wherein said plastic is glass-filled nylon.

* * * * *